3 Sheets—Sheet 1.

W. P. BISSELL.

BINDERS FOR INVOICES.

No. 7,885. Reissued Sept. 18, 1877.

Witnesses.
Chas J. Gooch
W. R. Edelen.

Inventor.
Willard P. Bissell
By Knight Bros
Attorneys

N. PETERS, PHOTO-LITHOGRAPHER, WASHINGTON, D. C.

3 Sheets—Sheet 2.

W. P. BISSELL.

BINDERS FOR INVOICES.

No. 7,885. Reissued Sept. 18, 1877.

*Witnesses.*

Chas J. Gooch

W. R. Edelen

*Inventor.*

Willard P. Bissell

By Knight Bros

Attorneys

N. PETERS, PHOTO-LITHOGRAPHER, WASHINGTON, D. C.

3 Sheets—Sheet 3.

W. P. BISSELL.

BINDERS FOR INVOICES.

No. 7,885. Reissued Sept. 18, 1877.

*Witnesses*

Chas. J. Good

W. R. Edelen.

*Inventor.*

Willard P. Bissell

By Knight Bros

Attorneys

N. PETERS, PHOTO-LITHOGRAPHER, WASHINGTON, D. C.

UNITED STATES PATENT OFFICE.

WILLARD PARKER BISSELL, OF RICHMOND, VIRGINIA.

IMPROVEMENT IN BINDERS FOR INVOICES.

Specification forming part of Letters Patent No. 190,269, dated May 1, 1877; Reissue No. 7,885, dated September 18, 1877; application filed July 10, 1877.

*To all whom it may concern:*

Be it known that I, WILLARD PARKER BISSELL, of Richmond, in the county of Henrico and State of Virginia, have invented new and useful Improvements in Invoice, Bill, or Letter Files, of which the following is a specification:

My invention relates to an improved construction of those files which consist of a cover, a stub, and an index, the invoices, bills, or letters being attached by paste or mucilage to the stub-ends, and a record made in the index at one end of the book of the position of such papers.

By my improvement I dispense with recording, thereby saving time, arrange the papers alphabetically, and use the ordinary index-leaves as beacons to show the position of the paper sought or the place that a paper ought to be filed away in.

My improvement consists, first, in arranging the indexed or lettered leaves at certain intervals throughout the stub-ends, so as to assign a sufficient number of said ends to each lettered page.

My improvement consists, secondly, in securing the stub with its lettered leaves to a cover by means of strings, cords, or bands engaging with loops or rings.

Figure 1:
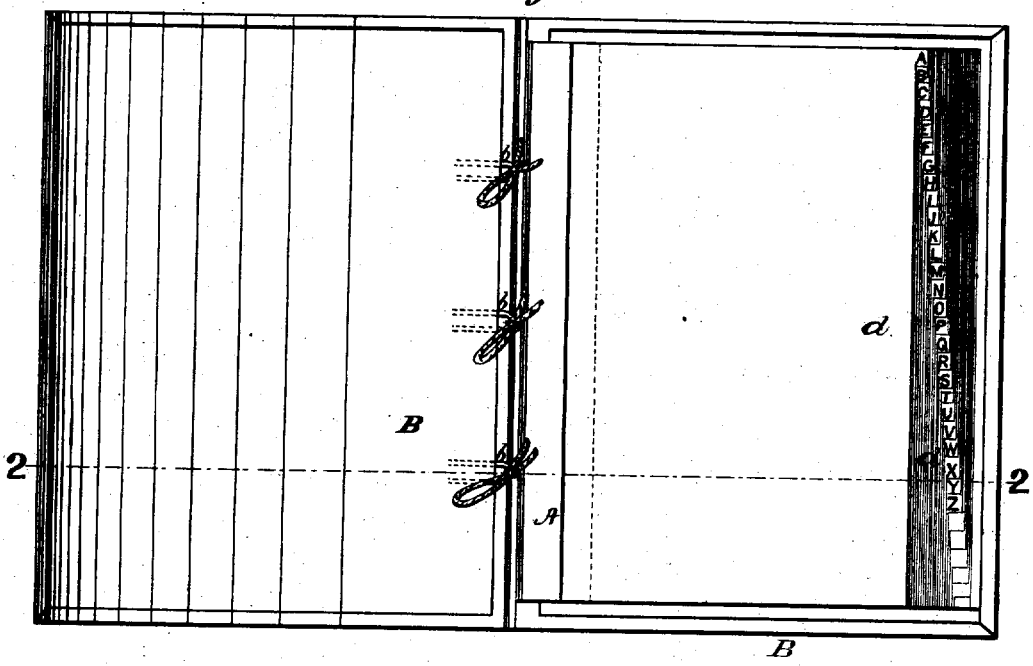
Figure 2:
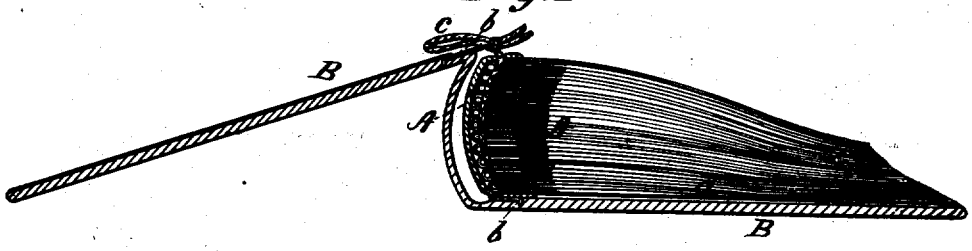
Figure 7:
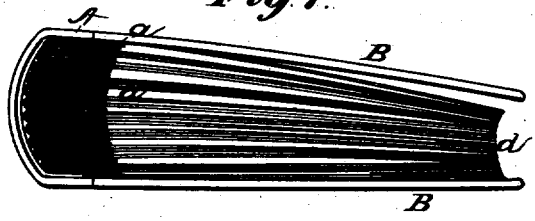
Figure 3:
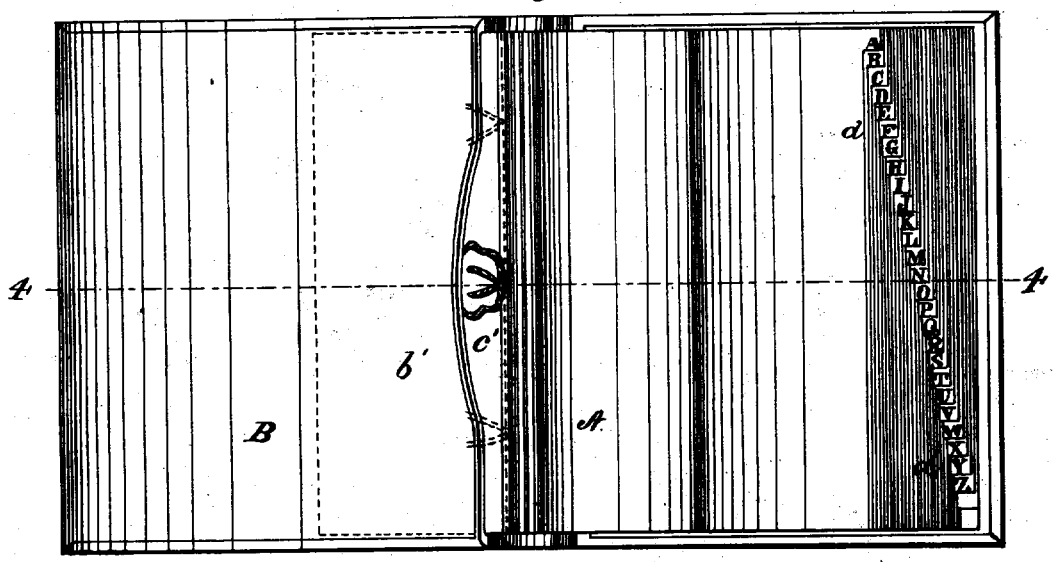
Figure 4:
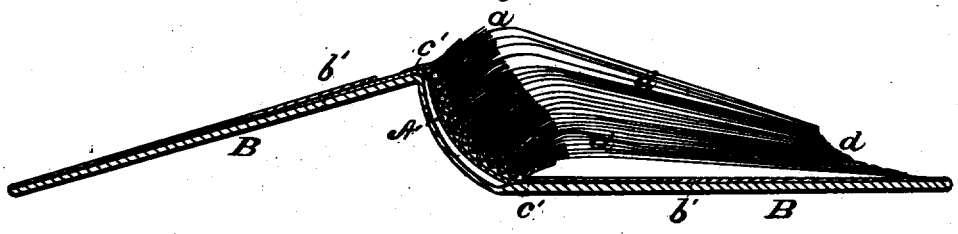
Figure 5:
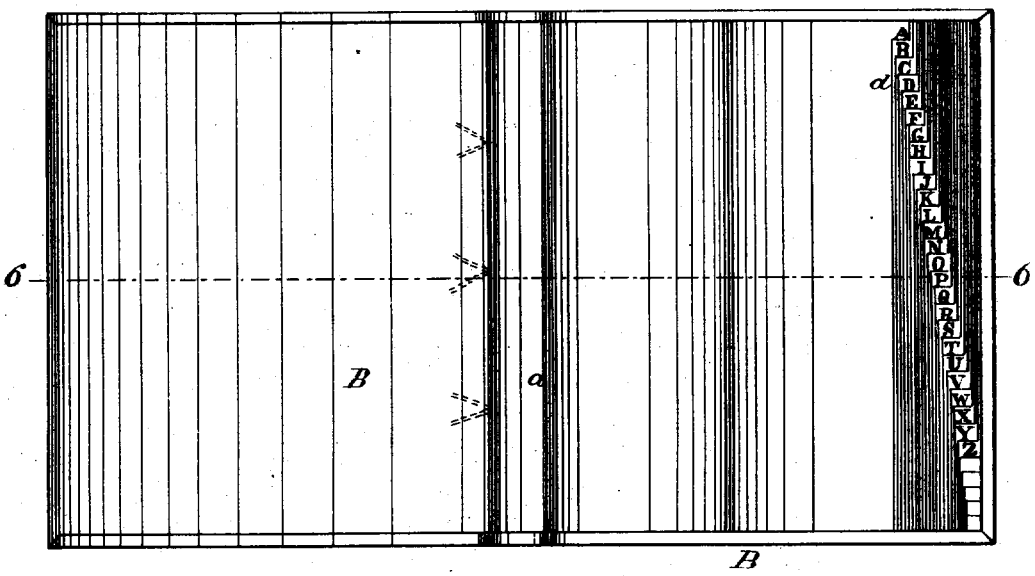
Figure 6:
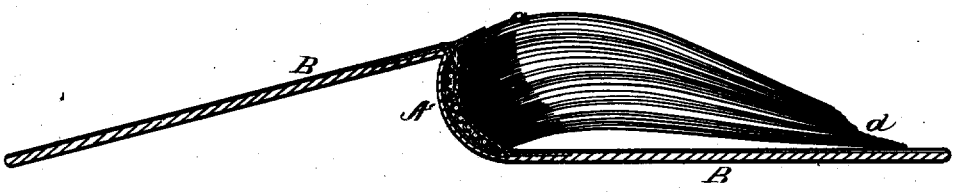

In the accompanying drawings, Figure 1 is a front view of an improved file open, showing the stub secured to its cover by means of strings, cords, or bands engaging with loops or rings. Fig. 2 is a section of the same on the line 2 2, Fig. 1. Fig. 3 is a front view of an open file, showing the stub secured to a cover by means of its stiff sides, which engage with pockets in the cover. Fig. 4 is a section on the line 4 4, Fig. 3. Fig. 5 is a front view of an open file, having a permanent binding. Fig. 6 is a section on the line 6 6, Fig. 5. Fig. 7 is an end view.

In carrying out my invention, A may represent a stub, having a number of stub-ends, *a*, and secured to a cover, B, in any suitable manner. Between the stub-ends *a* I insert leaves *d* (in the ordinary manner of attaching invoices or letters) by the use of paste or mucilage applied to the stub-end or edge of the leaf. Instead of attaching the leaves to the stub-ends, they may be bound up therewith, as shown in Figs. 4 and 6.

The leaves are lettered and arranged at certain intervals throughout the stub-ends, so as to assign a suitable number of said ends to each lettered page.

The leaves may be of the same material as the stub—of paper, bristol-board, parchment, or other suitable material.

In Figs. 1 and 2 I show the stub A secured to its cover by means of strings, cords, or bands *c* engaging with loops or rings *b*.

In Figs. 3 and 4 I show the stub A secured to its cover by its stiff sides *c'* entering pockets *b'*.

In Figs. 5, 6, and 7 I show the stub A secured to its cover by permanent binding.

It will be observed that, instead of attaching the invoices or letters in order of date at one side of the index, as heretofore, I locate them between the index-leaves, thus dispensing with the necessity of recording, as the papers form their own index.

By arranging the papers in the manner described they will be readily found, as it is only necessary to turn to the initial-leaf corresponding to that of the paper required.

To economize space I assign to each lettered leaf a certain number of stub-ends, *a*, sufficient to accommodate the average number of papers under each letter of the alphabet, so that there may not be an unnecessary number of stub-ends bound up in the file.

I am aware that paper-files having numbered pages, and stub-ends between said pages for holding the sides of notes or drafts when pressed by an elastic band, are old.

I am also aware that lettered leaves, provided with pockets for papers, have been bound up in books, and stub-ends with said pocketed leaves, to insure uniformity in thickness.

I am also aware that scrap-books for cuttings and clippings have been constructed with numbered pages, and stub-ends between said pages, so as to leave spaces for said cuttings.

Neither of these devices is adapted to be used as an ordinary letter or invoice book, because of the shortness of their stub-ends, and their pages or leaves being numbered or pocketed.

In my file I dispense with numbered pages, and rearrange the lettered leaves and stub-ends of an ordinary invoice or letter book, which, to be of any use, must have the ordinary length of stub-end—about one and a half inch long.

To apply papers to the short stub-ends employed to merely thicken a binding would be exceedingly laborious.

Therefore, I do not claim such devices as I have referred to, because entirely distinct articles of manufacture, and not suggestive of my improvement; but What I do claim as new and of my invention, and desire to secure by Letters Patent, is—

1. As a new article of manufacture, the file herein described, consisting of a stub, A, having the ordinary stub-ends *a*, for the permanent attachment of invoices, bills, or letters, in the usual manner, and the index or lettered leaves *d*, arranged at certain intervals between the stub-ends *a*, so as to assign a sufficient number of said stub-ends to each leaf, as and for the purpose set forth.

2. The invoice, bill, or letter file herein described, consisting of a stub, A, having stub-ends *a* and index-leaves *d* secured at certain intervals between stub-ends, and provided with a cover, B, attached by means of strings, cords, or bands, engaging with loops or rings, as and for the purpose set forth.

WILLARD PARKER BISSELL.

Witnesses:
A. R. QUARLES,
WM. SINTON.